(12) United States Patent
Stephens et al.

(10) Patent No.: US 8,607,666 B2
(45) Date of Patent: Dec. 17, 2013

(54) POWER TRANSFER UNIT WITH OUTPUT SHAFT HAVING INTEGRATED JOINT ASSEMBLY

(75) Inventors: Carl F. Stephens, Liverpool, NY (US); William A. Hellinger, Mexico, NY (US); Dale R. Fine, Cicero, NY (US)

(73) Assignee: Magna Powertrain of America, Inc., Troy, MI (US)

( * ) Notice: Subject to any disclaimer, the term of this patent is extended or adjusted under 35 U.S.C. 154(b) by 0 days.

(21) Appl. No.: 13/603,152

(22) Filed: Sep. 4, 2012

(65) Prior Publication Data

US 2012/0329566 A1 Dec. 27, 2012

Related U.S. Application Data

(63) Continuation of application No. 12/481,814, filed on Jun. 10, 2009, now Pat. No. 8,256,328.

(51) Int. Cl.
*F16H 37/06* (2006.01)
*F16H 37/08* (2006.01)

(52) U.S. Cl.
USPC .................. 74/665 F; 74/665 H; 475/202

(58) Field of Classification Search
USPC ...... 74/665 A, 665 B, 665 F, 665 GC, 665 H; 464/130, 132, 134, 135
See application file for complete search history.

(56) References Cited

U.S. PATENT DOCUMENTS

| | | | |
|---|---|---|---|
| 2,698,527 A | 1/1955 | Anderson | |
| 4,147,225 A * | 4/1979 | Mazziotti et al. | 180/247 |
| 4,688,447 A | 8/1987 | Dick | |
| 4,860,612 A * | 8/1989 | Dick et al. | 74/665 H |
| 5,116,293 A * | 5/1992 | Reuter | 475/202 |
| 5,226,860 A | 7/1993 | Baxter, Jr. et al. | |
| 5,376,051 A * | 12/1994 | Valencic | 464/130 |
| 5,618,234 A | 4/1997 | Carden | |
| 5,643,090 A * | 7/1997 | Smith | 464/130 |
| 5,725,453 A * | 3/1998 | Zalewski et al. | 475/204 |
| 5,868,626 A * | 2/1999 | Whitney | 464/134 |
| 6,827,649 B2 * | 12/2004 | Menosky et al. | 464/14 |
| 7,399,250 B2 * | 7/2008 | Gansloser et al. | 475/249 |

(Continued)

OTHER PUBLICATIONS

DR, Ing, Joerg Boerner, Dipl.-Ing. Klemens Humm, DR.-Ing. Franz J. Joachim; Development of Conical Involute Gears (Beveloids) for Vehicle Transmissions; Nov./Dec. 2005; Gear Technology; p. 28-35.

(Continued)

*Primary Examiner* — Troy Chambers
*Assistant Examiner* — Jude Agendia
(74) *Attorney, Agent, or Firm* — Dickinson Wright PLLC

(57) ABSTRACT

A power transmission device for a four-wheel drive vehicle includes an input shaft adapted to be driven by a power source. A first output shaft is rotatable about a first axis and adapted to transmit torque to a first driveline. A second output shaft is adapted to transmit torque to a second driveline and is rotatable about a second axis. The first and second axes diverge from one another. A transfer unit includes a drive member rotatably supported on the first output shaft and a driven member coupled to the second output shaft. A joint is positioned within a cavity formed in the driven member and drivingly interconnects the driven member and the second output shaft. The driven member includes first and second portions separable from and re-mountable to each other to allow service to the joint.

25 Claims, 5 Drawing Sheets

(56) References Cited

U.S. PATENT DOCUMENTS

| | | |
|---|---|---|
| 7,992,668 B2 * | 8/2011 | Smith et al. .................... 180/247 |
| 8,256,328 B2 * | 9/2012 | Stephens et al. ............. 74/665 F |
| 2001/0038772 A1 | 11/2001 | Wormsbaecher |
| 2004/0204251 A1 * | 10/2004 | Menosky et al. ............. 464/132 |
| 2005/0188784 A1 | 9/2005 | Knox et al. |
| 2006/0258501 A1 | 11/2006 | Wormsbaecher |
| 2008/0099267 A1 | 5/2008 | Ruehle et al. |

OTHER PUBLICATIONS

8. European All Wheel Drive Congress Graz 19. und 20. Apr. 2007 Allradtechnik im Spannungsfeld Zwischen Komplexitat und Kundennutzen 9 pages Gerhard Henning, DaimlerChrysler AG.

* cited by examiner

POWER TRANSFER UNIT WITH OUTPUT SHAFT HAVING INTEGRATED JOINT ASSEMBLY

CROSS-REFERENCE TO RELATED APPLICATIONS

This application is a continuation of U.S. patent application Ser. No. 12/481,814 filed on Jun. 10, 2009. The entire disclosure of the above application is incorporated herein by reference.

FIELD

The present disclosure relates generally to a power transmission device for use in a motor vehicle. More particularly, the present disclosure describes a transfer case having a compact serviceable front output shaft with a cardan joint.

BACKGROUND

Many sport-utility vehicles are equipped with a transfer case for transmitting drive torque to all four of the wheels, thereby establishing a four-wheel drive mode of operation. Some transfer cases are equipped with a mode shift mechanism which permits the vehicle operator to selectively shift between a two-wheel drive mode wherein only a primary (i.e., rear) driveline is driven and a "part-time" four-wheel drive mode wherein a secondary (i.e., front) driveline is rigidly coupled for rotation with the primary driveline.

In the past, the vehicle ride height and suspension configuration of many sport-utility vehicles provided sufficient packaging volume for a traditional transfer case having at least two rotating output shafts extending parallel to one another. In view of increased consumer demand for smaller four-wheel drive vehicles, the packaging volume allocated to the vehicle powertrain has been greatly reduced. While traditional transfer case designs may function in a satisfactory manner in certain vehicle applications, a need for an improved, compact, light weight power transmission device exists.

SUMMARY OF THE INVENTION

A power transmission device for use in a four-wheel drive vehicle includes an input shaft adapted to be driven by a power source. A first output shaft is rotatable about a first axis and is adapted to transmit torque to a first driveline. A second output shaft is adapted to transmit torque to a second driveline. The second output shaft is rotatable about a second axis. The first and second axes diverge from one another. A transfer unit includes a drive member rotatably supported on the first output shaft and a driven member coupled to the second output shaft. The drive member and the driven member are in a torque transferring arrangement with one another. A joint is positioned within a cavity formed in the driven member and drivingly interconnects the driven member and the second output shaft. The driven member includes first and second portions separable from and re-mountable to each other to allow service to the joint.

Furthermore, a power transmission device for use in a four-wheel drive vehicle includes an input shaft adapted to be driven by a power source. A first output shaft is rotatable about a first axis and adapted to transmit torque to a first driveline. A second output shaft is adapted to transmit torque to a second driveline. The second output shaft is rotatable about a second axis. The first and second axes diverge from one another. A transfer unit includes a drive member rotatably driven by the first output shaft and a driven member. The drive member and the driven member are in a torque transferring arrangement with one another. A cardan joint is positioned within a cavity formed in the driven member to drivingly interconnect the driven member and the second output shaft. The cardan joint includes a cross having first and second sets of trunnions, a yoke rotatably supporting the first set of trunnions, and straps fixed to the driven member to rotatably support the second set of trunnions.

BRIEF DESCRIPTION OF THE DRAWINGS

The disclosure will now be described, by way of example, with reference to the accompanying drawings in which.

DETAILED DESCRIPTION OF THE PREFERRED EMBODIMENTS

In general, the present disclosure relates to a power transmission device for a motor vehicle having a first output shaft rotatable about a first axis and a second output shaft that rotates about a second axis of rotation. The first and second axes need not extend parallel to one another. A clutch actuation system may operate a clutch associated with the first and second output shafts of the power transmission device for selectively or automatically shifting between a four-wheel drive mode and a two-wheel drive mode. A cardan joint is associated with the second output shaft to allow the second output shaft to rotate about the second axis that need not extend parallel to the first axis.

Figure 1:
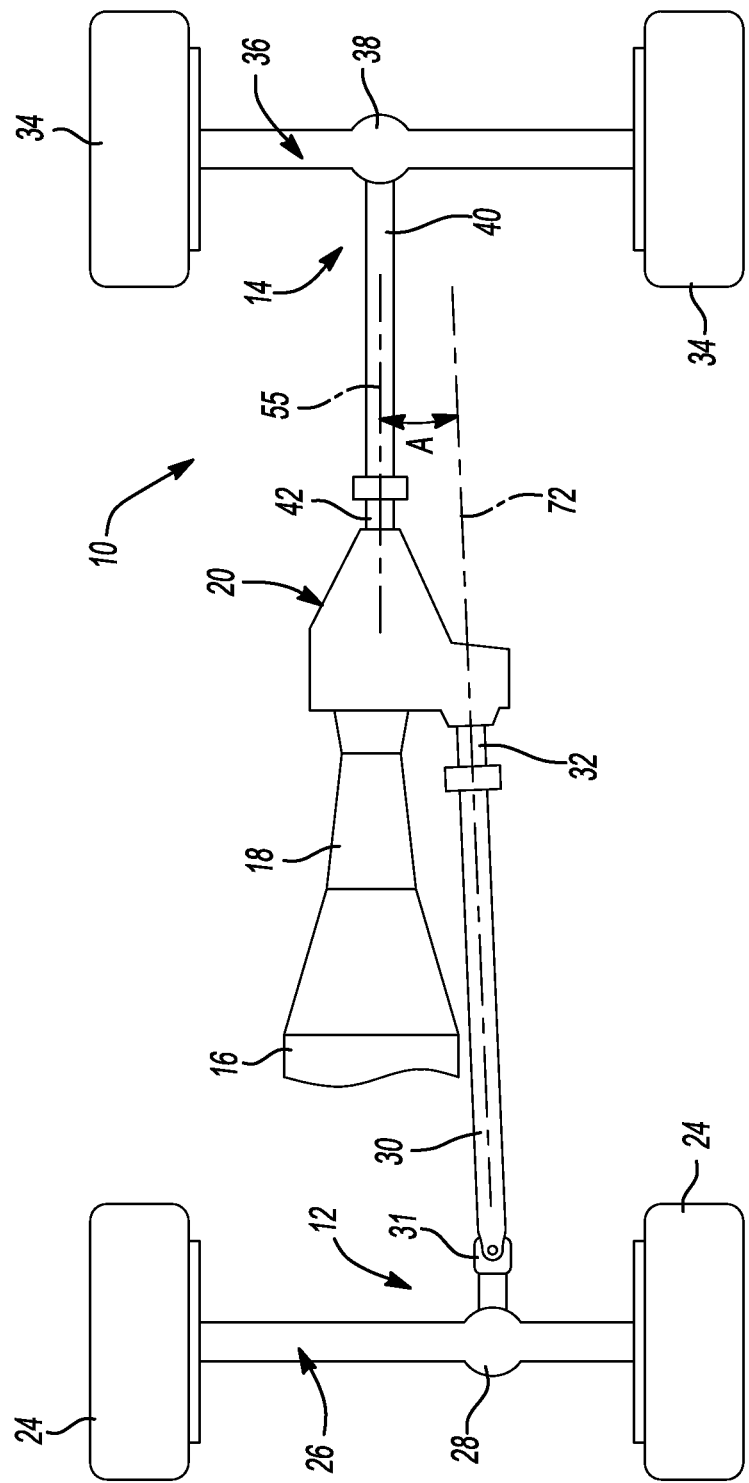
FIG. 1 is a schematic illustrating the drivetrain of a motor vehicle equipped with a power transmission device of the present disclosure.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a four-wheel drive system which incorporates a power transmission device 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propeller shaft 30 by a cardan joint 31. A constant velocity joint may be used in lieu of cardan joint 31. The opposite end of front propeller shaft 30 is coupled to a second or front output shaft assembly 32 of power transmission device 20. Similarly, rear driveline 14 includes a pair of rear wheels 34 connected at opposite ends of a rear axle assembly 36 having a rear differential 38 coupled to one end of a rear propeller shaft 40, the opposite end of which is interconnected to a first or rear output shaft 42 of power transmission device 20.

Figure 2:
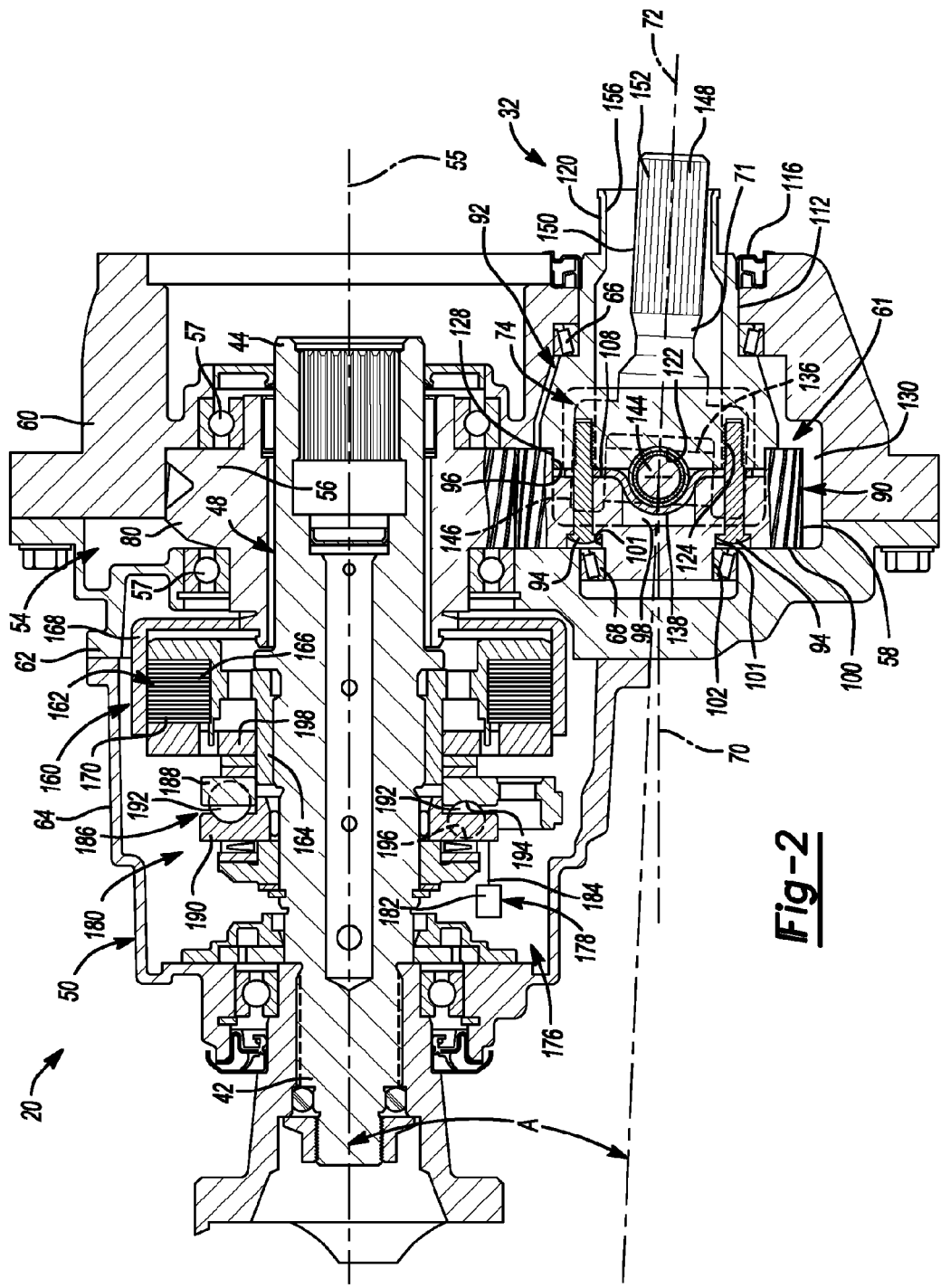
FIG. 2 is a cross-sectional view of the power transmission device according to the present disclosure.

With particular reference to FIG. 2 of the drawings, power transmission device 20 is shown to include an input shaft 44 adapted for connection to an output shaft of transmission 18 such that both are rotatably driven by engine 16 of the motor vehicle. In the arrangement depicted, rear output shaft 42 is integrally formed with input shaft 44 as a one-piece first shaft 48 that is rotatably supported in a housing assembly 50. Housing assembly 50 includes separable first, second and third housings 60, 62 and 64, respectively. Front output or second output shaft assembly 32 is also rotatably supported in housing assembly 50.

A transfer assembly 54 is provided for selectively transferring drive torque from first shaft 48 to second output shaft assembly 32. Transfer assembly 54 includes a first or drive gear 56 rotatably supported within housing assembly 50 by bearings 57. First shaft 48 is rotatable about a first axis 55 relative to drive gear 56. A second or driven gear 58 is in constant meshed engagement with drive gear 56. Driven gear 58 is formed as a part of second output shaft assembly 32. More particularly, second output shaft assembly 32 includes a shell 61 rotatably supported within first housing 60 by a first angular contact bearing 66. A second angular contact bearing 68 is positioned within second housing 62 to support shell 61 for rotation about a second axis 70. Second axis 70 is depicted as extending parallel to first axis 55. It should be appreciated that second axis 70 may be positioned at an angle relative to first axis 55 and may or may not intersect first axis 55.

Second output shaft assembly 32 also includes a yoke shaft 71 that is rotatable about a third axis 72 based on the use of a cardan joint 74. In FIG. 2, first axis 55 and third axis 72 diverge from one another and define an included angle A. Based on the geometry of cardan joint 74, third axis 72 always intersects second axis 70 at a point. However, third axis 72 may or may not intersect first axis 55. Angle A is defined as an angle shown taken along a plane containing first axis 55 and a point of intersection between second axis 70 and third axis 72. Such an arrangement may be accomplished by using bevel gears. Accordingly, the term "diverge" may apply to axes that truly intersect one another as well as skew axes that do not intersect. In the example depicted in FIGS. 1 and 2, angle A ranges substantially from 0.5 to 2.5 degrees.

Drive gear 56 is preferably constructed to include teeth 80 defining a circular cylindrical outer shape. Teeth 80 may be straight spur-type gear teeth or alternatively may be helically shaped. Driven gear 58 includes a set of circumferentially spaced apart teeth 82 in constant meshed engagement with teeth 80. Teeth 82 are also depicted as having a circular cylindrical shape. It should be appreciated that alternate transfer assemblies are contemplated for use within power transmission device 20. For example, one or more beveled gears may be substituted for drive gear 56 and/or driven gear 58. A set of sprockets drivingly interconnected by a chain may also be substituted as long as the driven member houses cardan joint 74.

Figure 3:
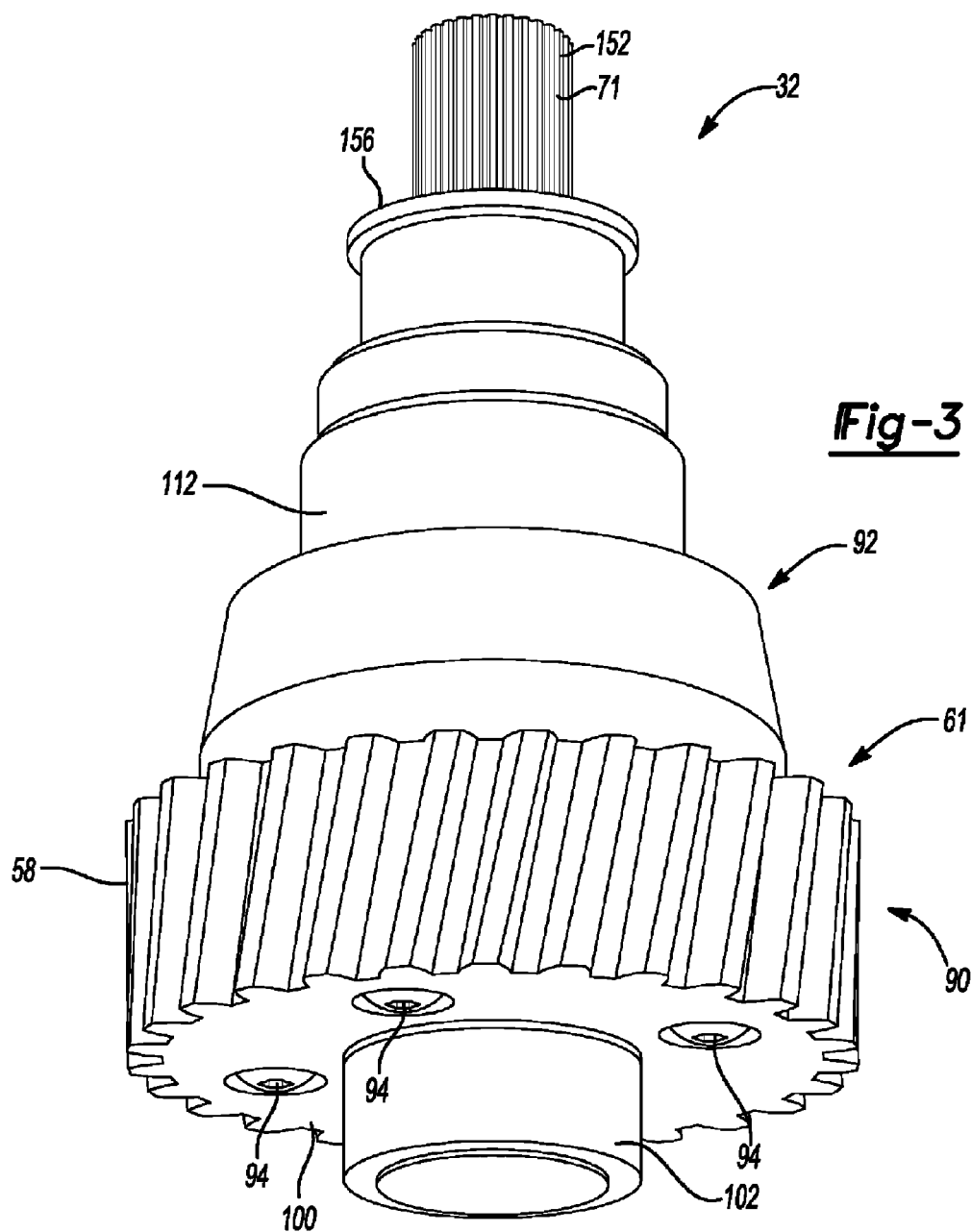
FIG. 3 is a perspective view of a driven member associated with the power transmission device shown in FIG. 2.
Figure 4:
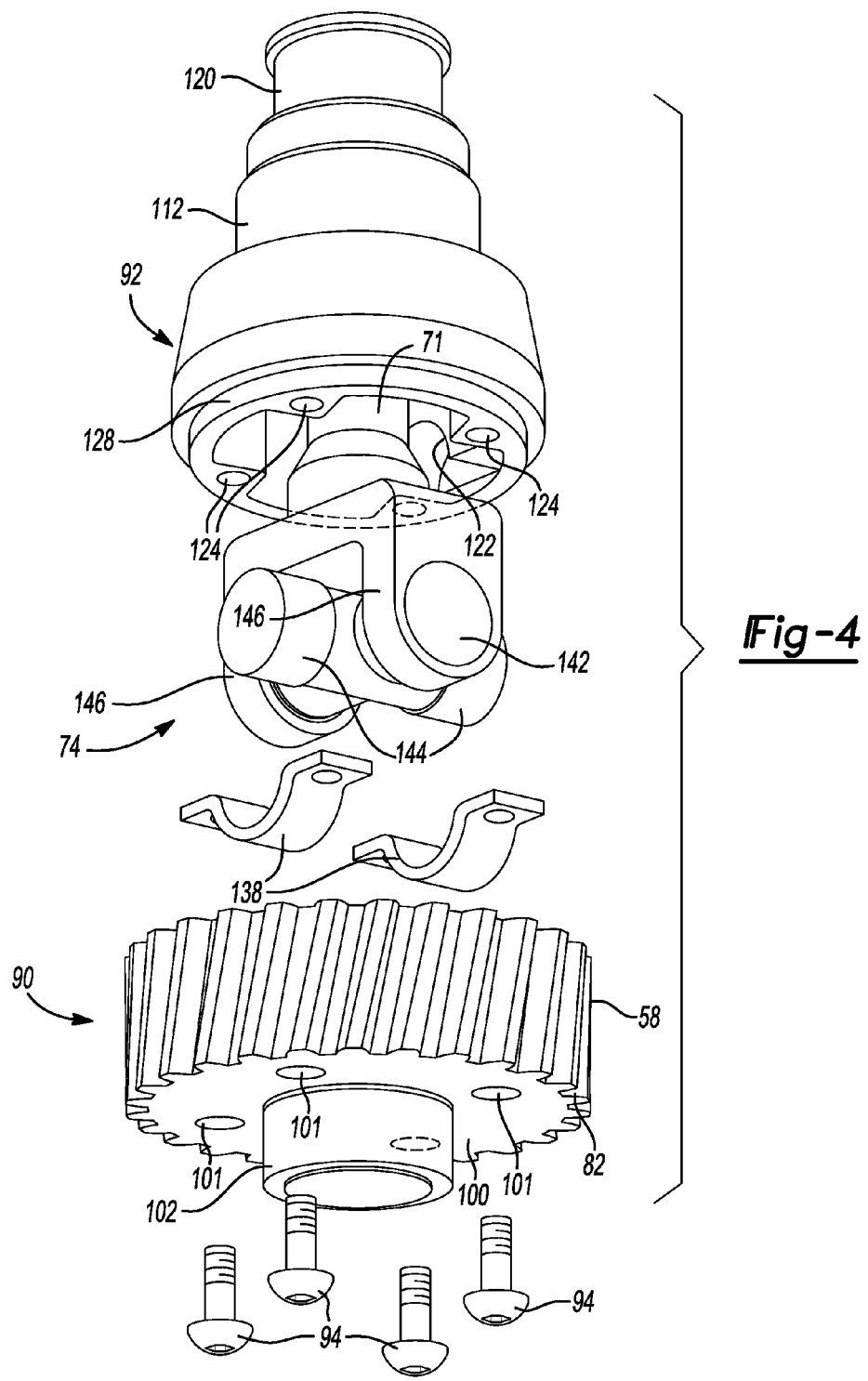
FIGS. 4 and 5 are exploded perspective views of the driven member shown in FIG. 3.
Figure 5:
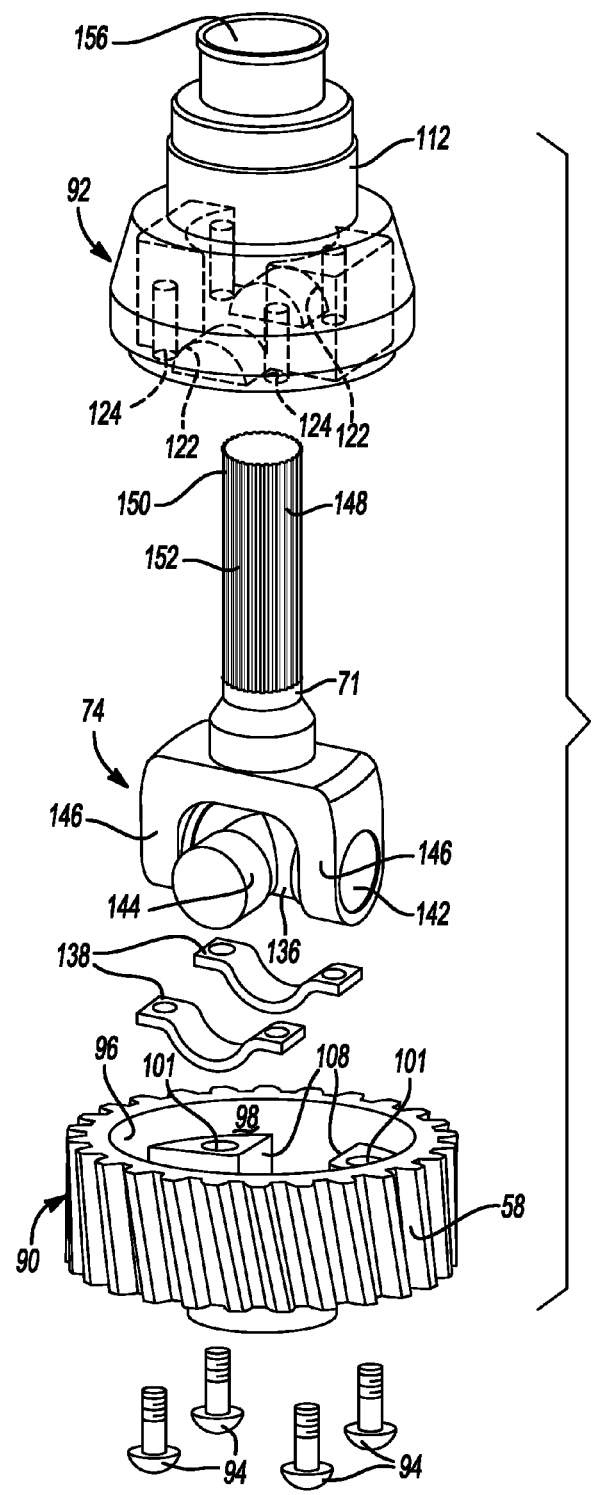

As best shown in FIGS. 3-5, second output shaft assembly 32 is a multi-part assembly including shell 61 having a first portion 90 fixed to a second portion 92 by a plurality of fasteners 94. First portion 90 includes driven gear 58 surrounding an inner cylindrical wall 96 defining a recess 98. First portion 90 also includes an end wall 100 having a plurality of through bores 101 in receipt of fasteners 94. A first hub 102 axially extends from end wall 100. Angular contact bearing 68 supports hub 102 for rotation. Angular contact bearing 68 may include tapered rollers, balls or a variety of other configurations designed to accurately support second output shaft assembly 32 for rotation within second housing 62 as well as react axial loading that may be generated due to the use of cardan joint 74. A plurality of posts 108 extend from end wall 100 into recess 98. Bores 101 extend through posts 108.

Second portion 92 includes a second hub 112 supported for rotation by angular contact bearing 66. A seal assembly 116 restricts contaminants from entering housing assembly 50 while allowing driven gear 58 to rotate relative thereto. Second portion 92 also includes a snout 120 protruding from housing assembly 50 to provide an attachment land for a boot (not shown). Semi-cylindrical journals 122 are formed on second portion 92. Threaded apertures 124 are positioned on opposite sides of journals 122, each being in receipt of one of threaded fasteners 94. A pilot 128 includes an outer diameter sized to closely mate with an inner diameter defined by inner wall 96.

Cardan joint 74 is positioned within a cavity 130 defined by first portion 90 and second portion 92. Cardan joint 74 includes yoke shaft 71, a cross 136 and a pair of straps 138. Cross 136 includes first and second trunnion pairs, 142, 144. Yoke shaft 71 includes bifurcated legs 146 supporting first pair of trunnions 142 for rotation. Journals 122 and straps 138 support second pair of trunnions 144 for rotation. Straps 138 are sandwiched between posts 108 and second portion 92. Fasteners 94 fix first portion 90 and straps 138 to second portion 92. Yoke shaft 71 includes a shaft portion 148 having a distal end 150 with an external spline 152 formed thereon. Shaft portion 148 extends through a bore 156 in second portion 92. Shaft portion 148 may be constrained such that axis 72 defines a constant angle A or shaft portion 148 may articulate during operation.

To provide means for establishing a drive connection between first shaft 48 and second output shaft assembly 32, power transmission device 20 includes a mode shift mechanism 160. Mode shift mechanism 160 includes a mode clutch 162 which is operable to couple drive gear 56 to first shaft 48 for establishing a four-wheel drive mode in which second output shaft assembly 32 is rigidly coupled for rotation with first shaft 48. In addition, mode clutch 162 is operable for selectively decoupling drive gear 56 from first shaft 48 for establishing a two-wheel drive mode in which all drive torque is delivered to rear output shaft 42.

According to the embodiment shown in FIG. 2, mode clutch 162 is normally operable in a non-actuated mode for transmitting all drive torque to rear output shaft 42, thereby establishing the two-wheel drive mode. Mode clutch 162 is also operable in a fully-actuated mode for establishing a "locked" four-wheel drive mode in which front output shaft assembly 32 is rigidly coupled to rear output shaft 42. In the embodiment shown in FIG. 2, mode clutch 162 is a friction plate clutch. Mode clutch 162 may be controlled to progressively regulate the amount of torque transferred to front output shaft assembly 32 automatically (i.e., on-demand) between its non-actuated and fully-actuated modes in response to and as a function of the amount of relative rotation (i.e., interaxle slip) between front output shaft assembly 32 and rear output shaft 42. The torque versus slip characteristics of mode clutch 162 can be tuned to meet specific vehicular applications.

Mode clutch 162 includes an inner hub 164 fixed to first shaft 48 and to which a set of inner clutch plates 166 are fixed. Mode clutch 162 also includes a drum 168 fixed for rotation with drive gear 56. Drum 168 is cylindrical and has a set of outer clutch plates 170 fixed thereto which are alternately interleaved with inner clutch plates 166 to define a multi-plate clutch pack. Other physical arrangements of mode clutch 162 (not shown) may perform the same function and are contemplated as being within the scope of the present disclosure.

A clutch actuation system 176 controls mode clutch 162. Clutch actuation system 176 includes an actuator 178 and may also include a rotary to linear movement conversion mechanism 180. In particular, actuator 178 includes a drive motor 182 for rotating a drive shaft 184. Drive shaft 184 is coupled to rotary to linear movement conversion mechanism

180. Rotary to linear movement conversion mechanism 180 includes a ball ramp unit 186. Ball ramp unit 186 includes a pair of cam rings 188, 190 and a plurality of balls 192. Each of cam rings 188 and 190 include grooves 194 and 196, respectively. Grooves 194 and 196 have varying depths. Balls 192 are positioned within grooves 194 and 196. When balls 192 are positioned at the deepest portion of grooves 194 and 196, cam rings 188 and 190 are spaced apart a first distance from one another. Cam ring 190 is rotatable relative to cam ring 188 to cause balls 192 to be positioned within the shallow portion of grooves 194 and 196. At this position, cam rings 188 and 190 are spaced apart from one another a distance greater than the first distance. In this manner, ball ramp unit 186 is operable to convert rotary motion to linear motion.

In operation, clutch actuation system 176 is controlled to apply a force on the mode clutch 162. Drive motor 182 rotates drive shaft 184 in a first direction which rotates cam ring 190 relative to cam ring 188 to axially move cam ring 188 and apply a force to an apply plate 198. Inner clutch plates 166 are frictionally engaged with outer clutch plates 170 by apply plate 198 to transfer drive torque from rear output shaft 42 to front output shaft assembly 32. Rotating drive motor 182 in the reverse direction rotates cam ring 190 back to a start position thereby removing the application force from mode clutch 162. Thus, second output shaft assembly 32 is no longer driven by first shaft 48. Alternatively, actuator 178 need not be configured to include a drive motor but may utilize other force transmitting mechanisms as appropriate. Furthermore, it should be appreciated that the clutch actuation system previously described may be replaced with a variety of other force application devices including hydraulically or electrically powered pumps acting on one or more pistons, motors driving one or more gearsets and power screws, among others.

The foregoing discussion discloses and describes various embodiments of the present disclosure. One skilled in the art will readily recognize from such discussion, and from the accompanying drawings and claims, that various changes, modifications and variations can be made therein without departing from the true spirit and fair scope of the disclosure as defined in the following claims.

What is claimed is:

1. A power transmission device for use in a four-wheel drive vehicle having a power source and first and second drivelines, the power transmission device comprising:
   a first shaft assembly rotatable about a first axis and having a first shaft and a drive member rotatably coupled to said first shaft, said first shaft being adapted to transmit torque from the power source to the first driveline; and
   a second shaft assembly having a second shaft adapted to transmit torque to the second driveline, a driven member in a torque transferring arrangement with said drive member, a joint positioned within a cavity formed in said driven member and drivingly interconnecting said driven member and said second shaft, and fasteners, said driven member including a first portion and a second portion configured to define said cavity there between with said second shaft extending through a bore formed in said second portion, and said joint including a cross having first and second sets of trunnions, a yoke fixed for rotation with said second shaft and coupled to said first set of trunnions, and mounting straps for coupling said second set of trunnions to said second portion of said driven member, wherein said fasteners couple said first portion to said second portion, wherein said driven member is rotatable about a second axis and said second shaft is rotatable about a third axis, and wherein said joint is operable to permit pivotal movement of said second shaft relative to said first shaft so as to vary the orientation of said third axis relative to said second axis.

2. The power transmission device of claim 1 wherein said first and second portions of said driven member are separable from and re-mountable to each other via said fasteners to allow service to said joint.

3. The power transmission device of claim 1 wherein said second axis is parallel to said first axis, and wherein said third axis diverges relative to said first axis as a result of pivotal movement of said second shaft relative to said driven member.

4. The power transmission device of claim 1 wherein said first portion defines a first recess configured to retain a first portion of said yoke and said second set of trunnions, wherein said second portion defines a second recess configured to retain a second portion of said yoke and said second set of trunnions, and wherein said first and second recesses define said cavity when said first portion is connected to said second portion via said fasteners.

5. The power transmission device of claim 4 wherein said mounting straps are disposed within said first recess in said first portion of said driven member, wherein said fasteners include threaded fasteners extending through aligned mounting bores in said first portion of said driven member and said mounting straps and are received in threaded apertures formed in said second portion of said driven member.

6. The power transmission device of claim 1 wherein said fasteners interconnect said first portion and said mounting straps to said second portion for coupling said yoke and said second shaft for common rotation with said driven member.

7. The power transmission device of claim 1 wherein said first portion includes a driven gear that is meshed with a drive gear associated with said drive member.

8. The power transmission device of claim 1 further including a clutch that can be selectively actuated to transfer torque from said first shaft to said drive member, and a clutch actuation system that is operable to control actuation of said clutch.

9. A power transmission device for use in a four-wheel drive vehicle having first and second drivelines, comprising:
   a drive member rotatably coupled to a first rotary member for rotation about a first rotary axis, said first rotary member adapted to be connected to the first driveline;
   a driven member coupled to a second rotary member for rotation about a second rotary axis, said driven member being in a torque transferring arrangement with said drive member;
   a third rotary member rotatable about a third rotary axis and which is adapted to be interconnected to the second driveline; and
   a joint positioned within a cavity formed in said second rotary member and drivingly interconnecting said third rotary member for rotation with said second rotary member, said joint being operable to permit pivotal movement of said third rotary member relative to said second rotary member so as to vary the angular relationship between said third axis and said second axis,
   wherein said second rotary member includes a first portion and a second portion configured to define said cavity therebetween with said third rotary member including a shaft portion extending through a bore formed in said second portion, wherein said joint includes a cross having first and second trunnions, a yoke fixed for rotation with said shaft portion of said third rotary member and pivotably coupled to said first trunnions, straps for pivotably coupling said second trunnions to said second portion of said second rotary member, and fasteners for coupling said first portion to said second portion so as to couple said shaft portion for rotation with said second rotary member while permitting pivotal movement of said shaft portion relative to said second rotary member.

10. The power transmission device of claim 9 wherein said first and second portions of said second rotary member are separable from and remountable to each other via said fasteners to allow service to said joint.

11. The power transmission device of claim 9 defining a transfer case wherein said first rotary member is a first output shaft adapted for connection to the first driveline and said third rotary member is a second output shaft adapted for connection to the second driveline.

12. The power transmission device of claim 9 wherein said first portion defines a first recess configured to retain a first portion of said yoke and said second set of trunnions, wherein said second portion defines a second recess configured to retain a second portion of said yoke and said second set of trunnions, and wherein said first and second recesses define said cavity when said first portion is connected to said second portion via said fasteners.

13. The power transmission device of claim 12 wherein said straps are disposed within said first recess in said first portion of said second rotary member, wherein said fasteners include threaded fasteners extended through aligned mounting bores in said first portion of said second rotary member and said straps and are received in threaded apertures formed in said second portion of said second rotary member.

14. The power transmission device of claim 9 wherein said drive member is a drive gear rotatably driven by said first rotary member, and wherein said driven member is a driven gear rotatably driven by said second rotary member and which is in meshed engagement with said drive gear.

15. The power transmission device of claim 14 wherein said driven gear is fixed for rotation with said first portion.

16. The power transmission device of claim 9 wherein said second axis is parallel to said first axis, and wherein said third axis diverges relative to said first axis.

17. The power transmission device of claim 9 further including a clutch that can be selectively actuated to transfer torque from said first rotary member to said drive member, and a clutch actuation system operable to control actuation of said clutch.

18. A transfer case for use in a four-wheel drive vehicle having first and second drivelines, comprising:
    a drive member rotatably coupled to a first shaft for rotation for rotation about a first rotary axis, said first shaft adapted to be connected to the first driveline;
    a driven member coupled to a rotary member for rotation about a second rotary axis, said driven member being in a torque transferring arrangement with said drive member;
    a second shaft rotatable about a third rotary axis and which is adapted to be interconnected to the second driveline; and
    a joint positioned within a cavity formed in said rotary member and drivingly interconnecting said second shaft for rotation with said rotary member, said joint being operable to permit pivotal movement of said second shaft relative to said rotary member so as to vary the angular relationship between said third axis and said second axis, wherein said rotary member includes a first portion and a second portion configured to define said cavity therebetween and with said second shaft extending through a bore in said second portion, wherein said joint includes a cross having first and second trunnions a yoke fixed for rotation with said second shaft and pivotably coupled to said first trunnions, straps for pivotably coupling said second trunnions to said second portion, and fasteners for releasably securing said first portion to said second portion.

19. The transfer case of claim 18 wherein said first portion defines a first recess configured to retain a first portion of said yoke and said second trunnions, wherein said second portion defines a second recess configured to retain a second portion of said yoke and said second trunnions, and wherein said first and second recesses define said cavity when said first portion is connected to said second portion via said fasteners.

20. The transfer case of claim 19 wherein said mounting straps are disposed within said first recess in said first portion of said driven member, wherein said fasteners include threaded fasteners extending through aligned mounting bores in said first portion of said driven member and said mounting straps and are received in threaded apertures formed in said second portion of said driven member.

21. The transfer case of claim 18 wherein said rotary member is a shell having said first portion interconnected to said second portion that together define said cavity, and wherein said driven member is fixed for rotation with said first portion while second shaft extends outwardly through a bore formed in said second portion and is pivotably moveable relative thereto.

22. The transfer case of claim 18 wherein said second axis is parallel to said first axis, and wherein said third axis diverges relative to said first axis.

23. A power transmission device for use in a motor vehicle having a power source and first and second drivelines, the power transmission device comprising:
    a housing;
    a first shaft supported by said housing for rotation about a first rotary axis, said first shaft adapted to transmit drive torque from the power source to the first driveline;
    a transfer assembly including a drive member rotatably mounted on said first shaft and a driven member in a torque transferring arrangement with said drive member, said driven member supported by said housing for rotation about a second rotary axis and including a shell having a first portion and a second portion defining a cavity therebetween;
    a clutch for selectively coupling said drive member to said first shaft for transmitting drive torque from said first shaft to said driven member;
    a second shaft supported by said shell for rotation about a third rotary axis and which is adapted for connection to the second driveline; and
    a joint assembly positioned within said cavity in said shell and drivingly interconnecting said second shaft for rotation with said driven member while facilitating pivotal movement of said second shaft relative to said driven member so as to vary the orientation of said third axis relative to said second axis, said joint assembly including a cross having first and second sets of trunnions, a yoke fixed for rotation with said second shaft about said third axis and pivotably coupled to said first set of trunnions, mounting members for pivotably coupling said second set of trunnions to one of said first and second portions of said shell, and fasteners for releasably fastening said first portion to said second portion whereby said second shaft rotates in common with said driven member.

24. The power transmission device of claim 23 wherein said fasteners extend through aligned mounting apertures in said first portion, said mounting straps and said second portion.

25. The power transmission device of claim 24 wherein said drive member includes a drive gear, wherein said driven member further includes a driven gear fixed to said shell and which is meshed with said drive gear, and wherein said clutch is operable for selecting coupling said drive gear to said first shaft.

* * * * *